A. R. SILVERSTON.
FLUID DISPLACING MOTOR.
APPLICATION FILED OCT. 14, 1909.
1,118,374.
Patented Nov. 24, 1914.
6 SHEETS—SHEET 1.
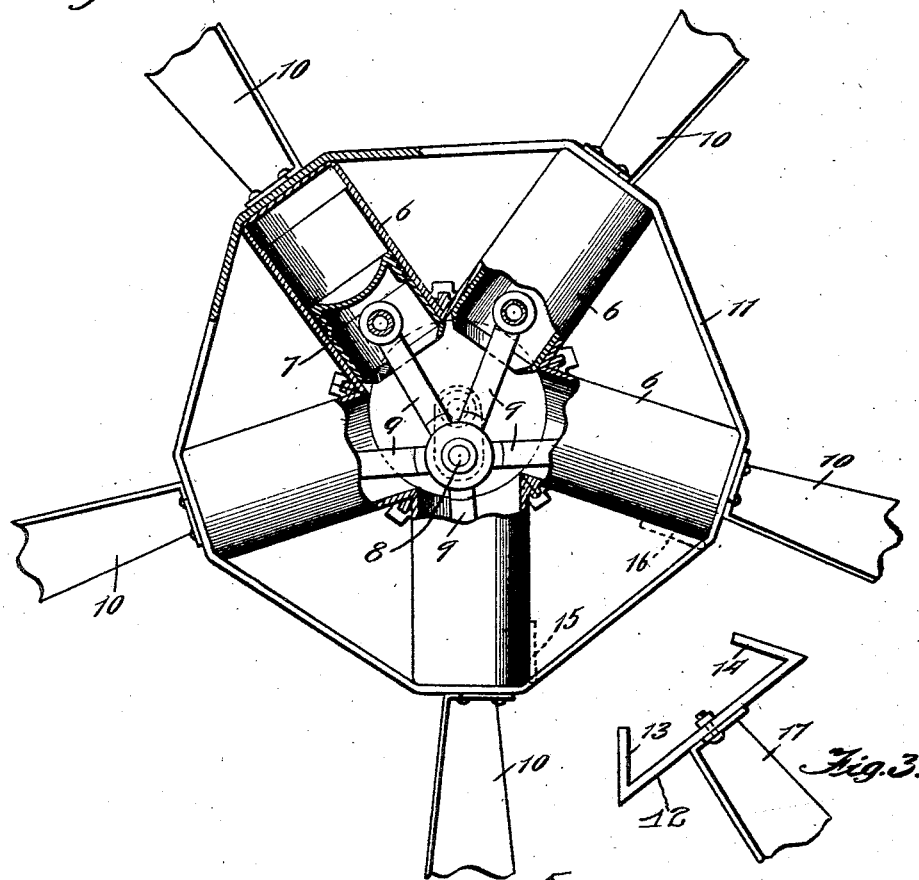
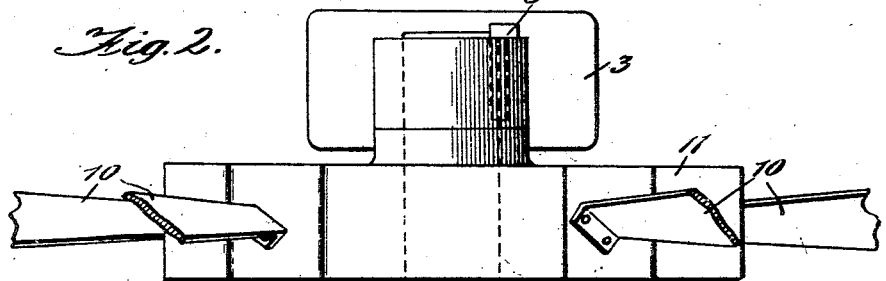
Witnesses:
Inventor:
Anthony R. Silverston A. R. SILVERSTON.
FLUID DISPLACING MOTOR.
APPLICATION FILED OCT. 14, 1909.
1,118,374.
Patented Nov. 24, 1914.
6 SHEETS—SHEET 2.
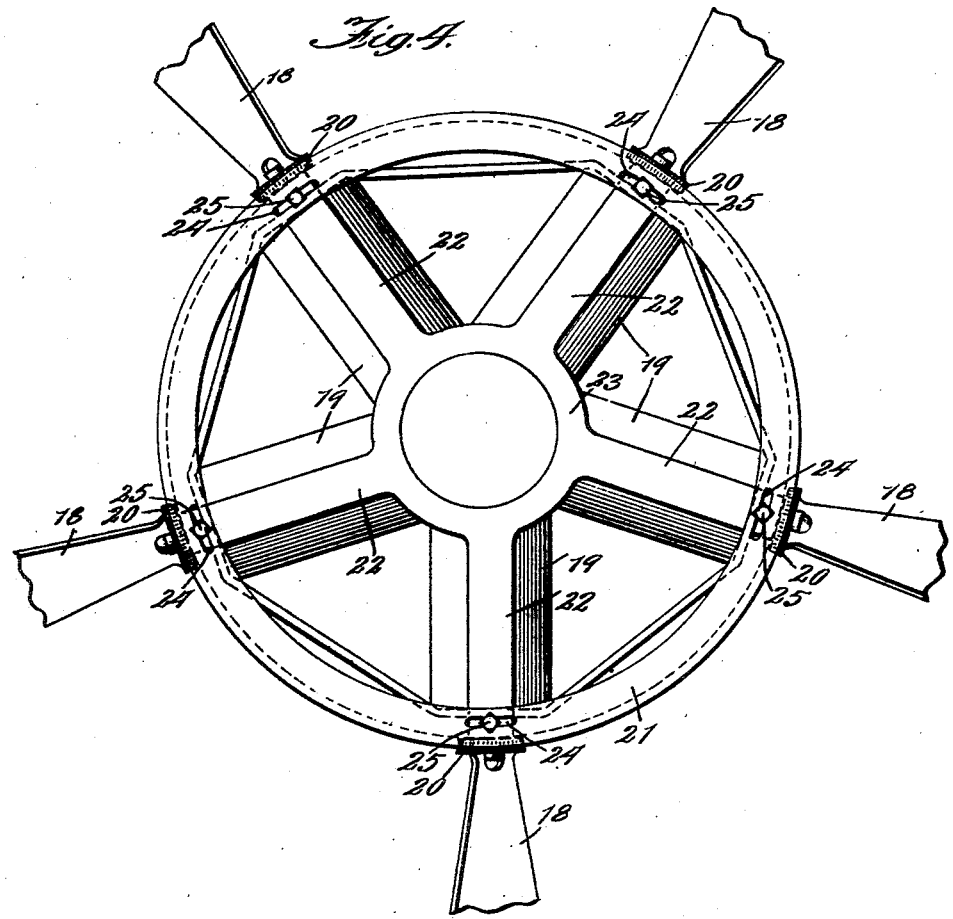
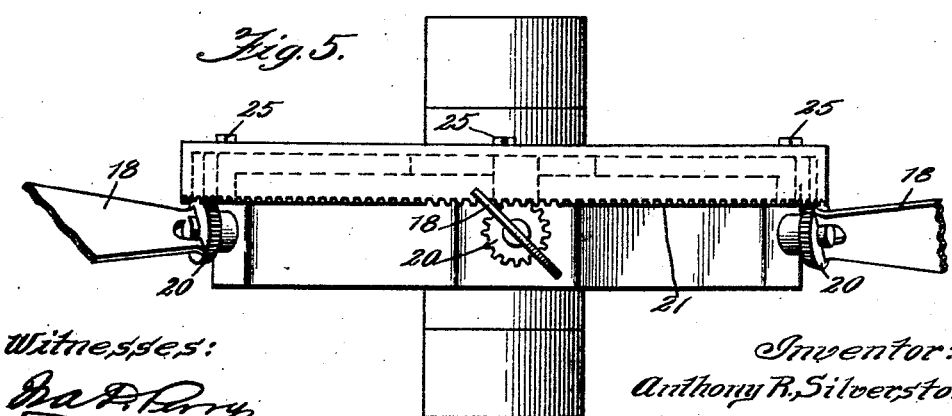
Witnesses:
Inventor:
Anthony R. Silverston

A. R. SILVERSTON.
FLUID DISPLACING MOTOR.
APPLICATION FILED OCT. 14, 1909.

1,118,374.

Patented Nov. 24, 1914.

6 SHEETS—SHEET 3.

Witnesses:

Inventor:
Anthony R. Silverston

A. R. SILVERSTON.
FLUID DISPLACING MOTOR.
APPLICATION FILED OCT. 14, 1909.

1,118,374.

Patented Nov. 24, 1914.
6 SHEETS—SHEET 4.

Witnesses:

Inventor:
Anthony R. Silverston

A. R. SILVERSTON.
FLUID DISPLACING MOTOR.
APPLICATION FILED OCT. 14, 1909.

1,118,374.

Patented Nov. 24, 1914.
6 SHEETS—SHEET 5.

Witnesses:

Inventor:
Anthony R. Silverston
By Brown & Hopkins
Attys

A. R. SILVERSTON.
FLUID DISPLACING MOTOR.
APPLICATION FILED OCT. 14, 1909.
1,118,374.
Patented Nov. 24, 1914.
6 SHEETS—SHEET 6.
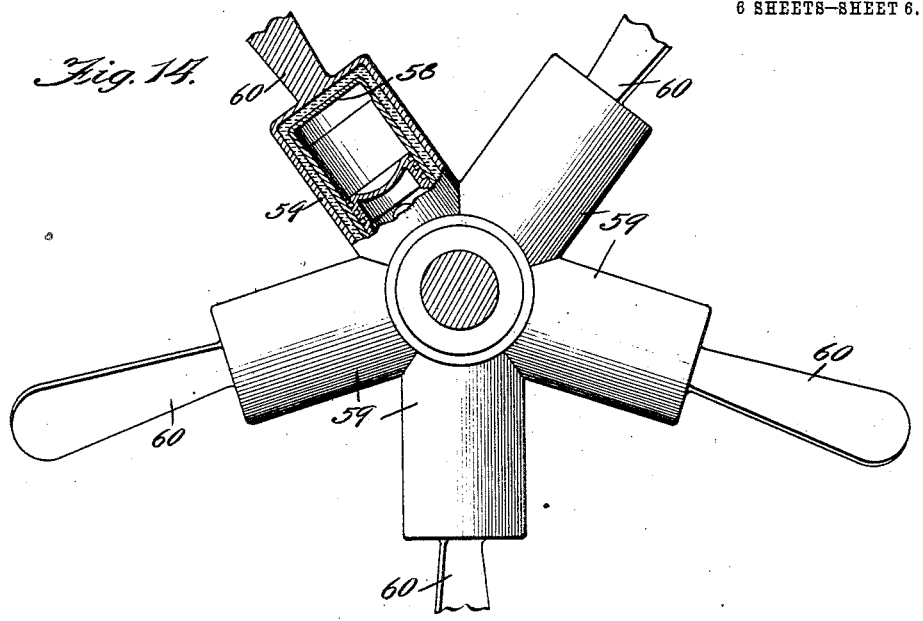
Fig. 14.
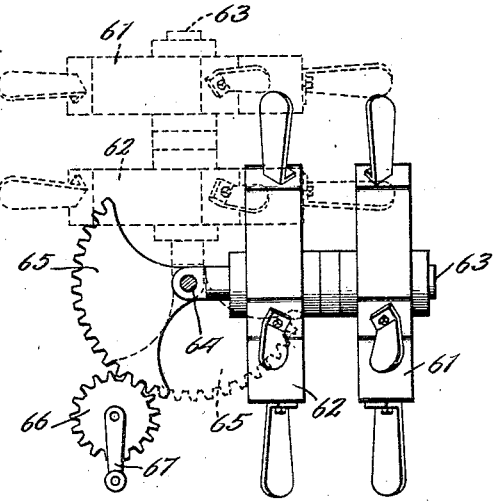
Fig. 15.
Fig. 16.
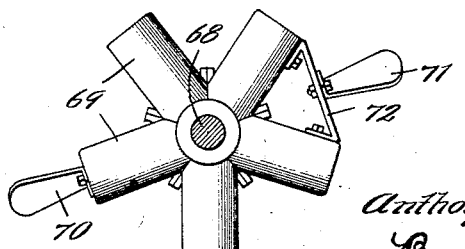
Witnesses:
Inventor:
Anthony R. Silverston
By Brown & Hopkins
Attys

UNITED STATES PATENT OFFICE.

ANTHONY R. SILVERSTON, OF MILWAUKEE, WISCONSIN.

FLUID-DISPLACING MOTOR.

1,118,374.  Specification of Letters Patent.  Patented Nov. 24, 1914.

Application filed October 14, 1909. Serial No. 522,550.

*To all whom it may concern:*

Be it known that I, ANTHONY R. SILVERSTON, a citizen of the United States, residing at Milwaukee, in the county of Milwaukee and State of Wisconsin, have invented certain new and useful Improvements in Fluid-Displacing Motors, of which the following is a specification.

This invention relates to fluid displacing motors, and has for its primary object to provide an improved fluid displacing motor which shall be light, durable and which can be economically manufactured.

One of the objects of this invention is to provide an improved construction for fluid displacing motors according to which the provision of the usual fly-wheel may be dispensed with.

Another object, is to provide improved means for obviating the formation of eddy currents and thereby increasing the fluid displacing capacity of the propeller.

Another object is to provide improved means in a fluid displacing motor for counterbalancing the gyrational effects produced therein.

A still further object is to provide an improved combined cooling jacket and propeller.

Still another object is to provide an improved construction, combination and arrangement of parts for a fluid displacing motor.

Other and further objects will appear in the specification and be more particularly pointed out in the appended claims in connection with the drawings exemplifying this invention, and in which—

Figure 6:
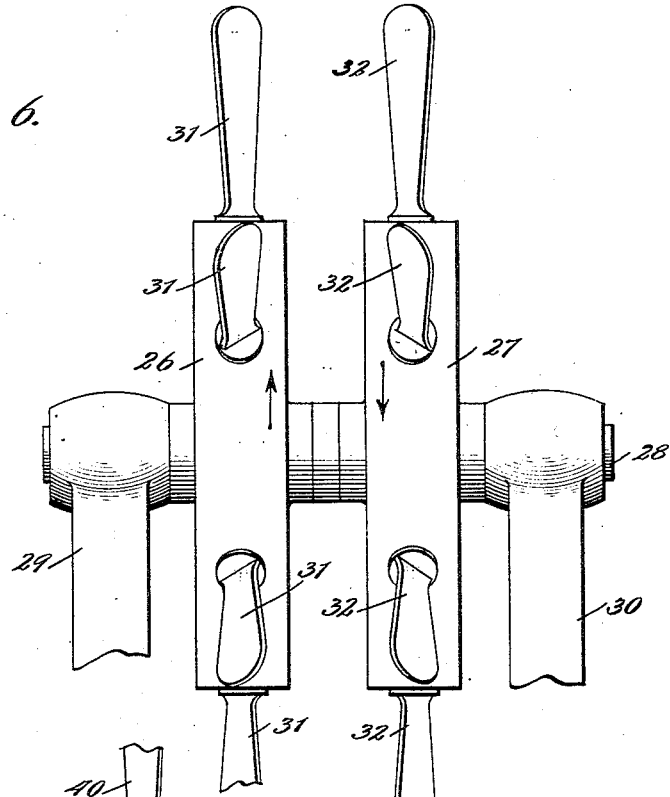
Figure 7:
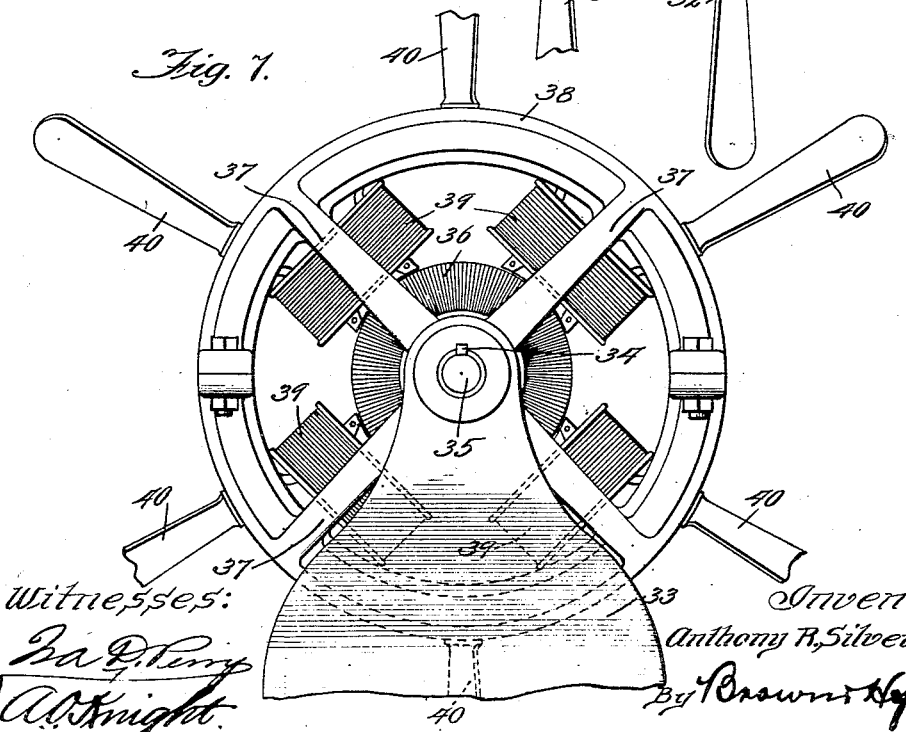
Figure 9:
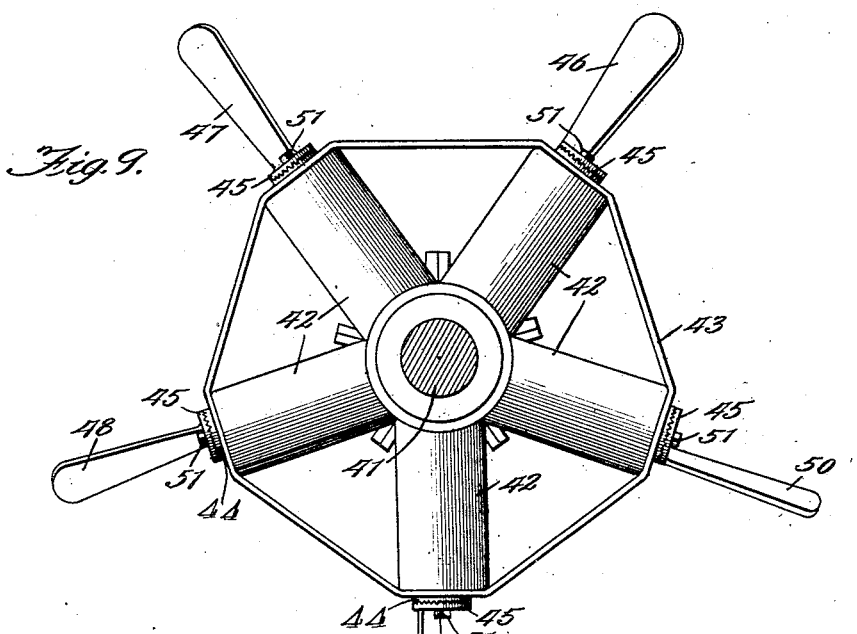
Figure 8:
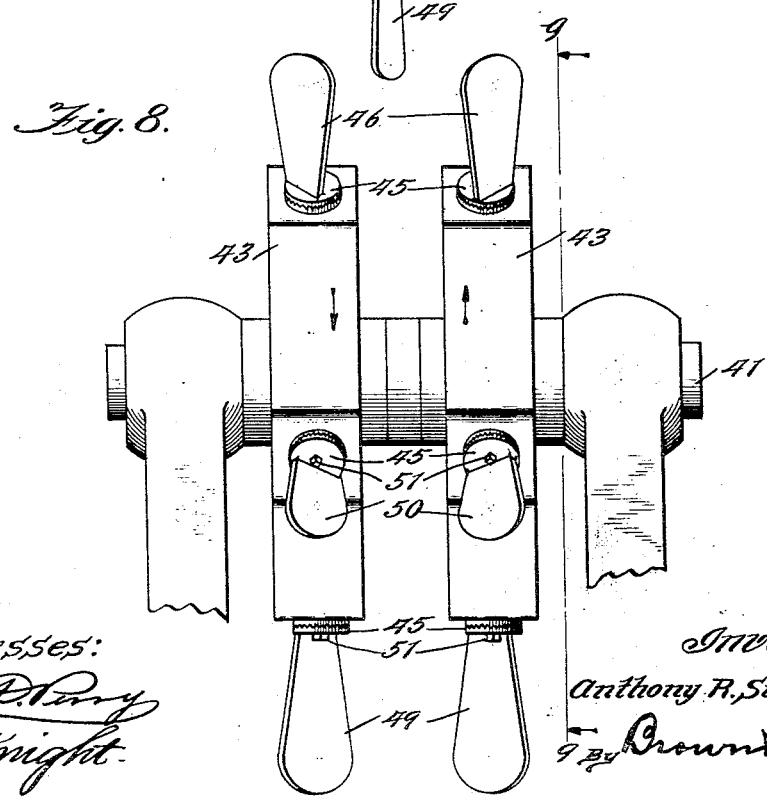
Figure 10:
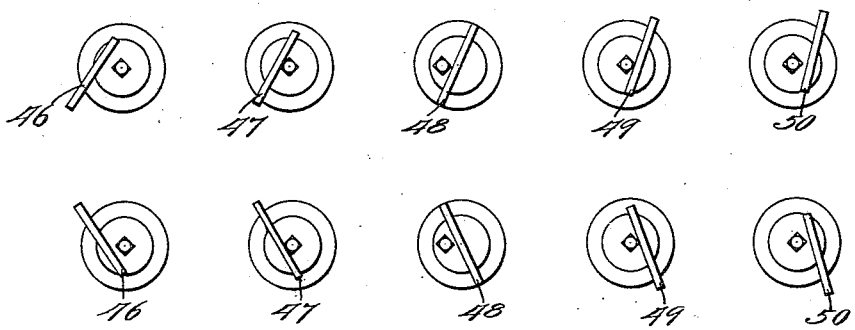
Figure 11:
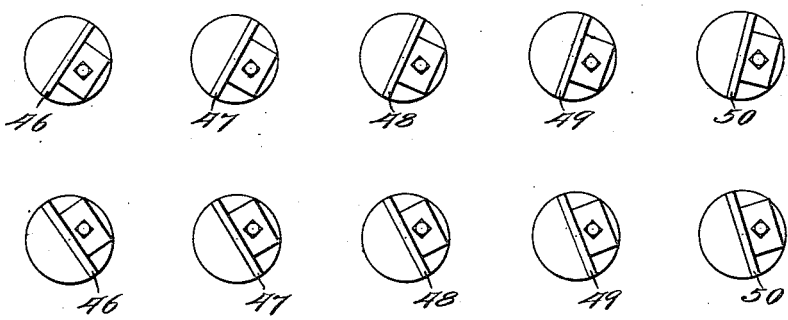
Figures 12, 13:
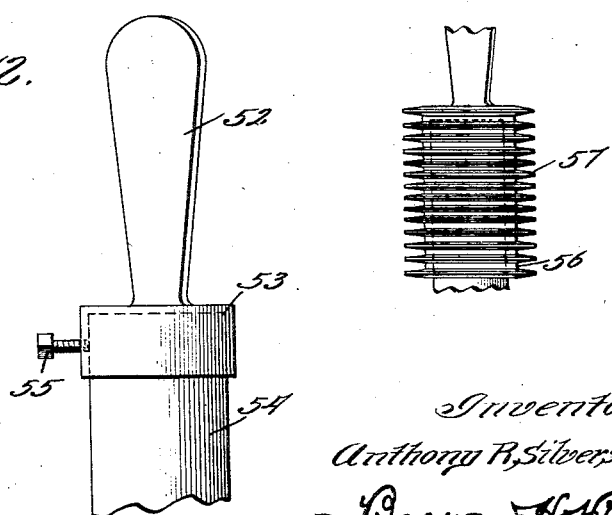

Figure 1 is a front view partly in section of one embodiment of a fluid displacing motor constructed in accordance with this invention. Fig. 2 is a top view of the same. Fig. 3 is a detail view showing a modification of the blade mounting means. Fig. 4 is a rear view of another embodiment of the invention in which are provided means for adjusting the pitch of the blades. Fig. 5 is a top view of the embodiment shown in Fig. 4. Fig. 6 is a side elevation partly broken away of still another embodiment according to which two motors with their respective propellers are made to revolve in opposite directions. Fig. 7 is a front elevation of another embodiment showing the application of the present invention to an electric motor. Fig. 8 is a side elevation of an embodiment similar to that shown in Fig. 6, showing means for adjusting the pitch of each propeller blade independently. Fig. 9 is a section on the line 9—9 of Fig. 8. Fig. 10 is a diagrammatic view illustrating the relative angular setting of the propeller blades according to a modification of the embodiment shown in Figs. 9 and 10. Fig. 11 is a similar diagrammatic view of another modification of the same. Fig. 12 is a detail elevation of an embodiment according to which a blade is provided with an integral cap fitting over the end of the cylinder. Fig. 13 is a detail of a modification of the embodiment shown in Fig. 12, according to which the cap is elongated and provided with cooling ribs. Fig. 14 is a front elevation partly in section of another embodiment. Fig. 15 is a diagrammatic plan view of a device for revolubly mounting my improved propeller. Fig. 16 is a front elevation of an embodiment illustrating the employment of but two blades with a motor similarly constructed to the embodiment shown in Fig. 1.

In pursuance of the objects of the present invention, an improved combination and arrangement of parts has been provided according to which a motor embodying an inner stationary member and an outer member revolving about the stationary member is operably connected with a suitable propeller, preferably by mounting said propeller directly upon the revolving motor. Preferably, the fixed or stationary member comprises a pivot or shaft rigidly mounted in any suitable manner, or, in the case of an electric motor, of a rigidly mounted armature with its shaft, while the revoluble member preferably comprises either one or more complete motor units of a reciprocating type, or the housing of a rotary type, which, if the rotary member be electric, consists of the field parts.

Referring more particularly to the embodiments shown in the drawings, and first to Figs. 1 and 2, the fixed or stationary member is constituted by a shaft 1 rigidly mounted in pillow blocks 2 and 3 by means of keys 4 and 5. According to this embodiment, the revolving members preferably consist each of a plurality of motor units of a reciprocating type which are rigidly connected together to provide a frame which is rotatably mounted upon said fixed shaft in any suitable manner, not specifically concerned in this invention. Each of said motor units comprises a cylinder 6 with a piston 7 reciprocably mounted therein, said piston being operably connected with a fixed crank pin 8 by means of a connecting rod 9, by which construction each of the motor units are made to travel in an orbit around the fixed shaft 1 in a well known manner. In order to adapt the engine thus constructed to act as a fluid displacing propeller, a plurality of propeller blades are operably connected with said engine, preferably in such manner as to be carried thereby. With this object in view and according to the present embodiment, a plurality of propeller blades 10 are mounted on the outer ends of the cylinders 6, preferably by rigidly securing said propeller blades 10 upon a band or strap 11, which passes about and is rigidly secured to the outer ends of said cylinders. According to Fig. 3, a modification of this blade mounting means is shown in which a bar 12 with angularly bent ends 13 and 14 is adapted to be secured in position in each of the spaces between the adjacently mounted cylinders 6. For this purpose the adjacent walls of said cylinders are preferably provided with pads 15 and 16, shown in dotted lines in Fig. 1, which are adapted to have each of said bars 12 rigidly mounted thereon. Carried by each of said bars 12 is a propeller blade 17, which by this construction will be mounted intermediately of the cylinders 6.

According to the embodiment shown in Figs. 4 and 5 of the drawings, a plurality of propeller blades 18 are adjustably mounted about the outer ends of a plurality of cylinders 19, preferably by making said blades rotatable upon their own axes, which radiate from the axis of the stationary shaft 1. As a preferable means for adjusting these blades on their axes, in order to make it possible to vary the pitch of the same, each of said blades has rigidly connected therewith a beveled pinion 20 with which intermeshes a beveled ring gear 21 which is rotatably mounted by means of a plurality of arms 22, which radiate from the hub portion 23, which is rotatably mounted in any suitable manner upon the frame provided by the rigidly connected cylinders 19. It will thus be seen that as the ring gear 21 is rotated about the axis of the fixed shaft, the blades 18 will be rotated about their axes to adjust their angular pitch on said frame. In order to provide means for permitting the adjustment by rotating the ring 21, said ring is provided adjacent to the end of each of said cylinders 19 with an arcuate slot 24, which slidably engages with a bolt 25 passing through said slot and into each of the cylinders 19, said bolt being adapted to rigidly hold the ring 21 in any position to which it is adjusted, and to be loosened to permit said ring to be moved from its adjusted position.

Referring now to the embodiment shown in Fig. 6, a construction of a fluid displacing motor according to this invention is shown in which two of said motors 26 and 27 are co-axially mounted upon the same fixed shaft 28, said shaft being rigidly keyed to the pillow blocks 29 and 30 on either end thereof. The construction of each of said motors 26, 27 is similar to those embodiments already described, with the exception that the blades 31 upon one of said motors are pitched oppositely to the direction in which the blades 32 of the motor 27 are pitched. Said motors in operation are caused to revolve in opposite directions, thereby obviating the formation of eddy currents. Inasmuch as said motors comprise parts of similar construction and arrangement, the gyrational forces produced in one of said motors tend to neutralize the effects of similar forces produced in the other of said motors and also to increase the efficiency of propeller thrust. It will be evident that this construction would also be applicable to electric motors.

By reference to Fig. 7 of the drawings, the application of the present invention to an electric motor is shown. According to this embodiment, the rigidly supported base member 33 has rigidly secured thereto by means of a key 34 an armature shaft 35 upon which is mounted an armature 36. By means of a plurality of radially extending arms 37 rigidly connected to form a rotating frame, the outer shell or housing 38 of the motor is rotatably mounted upon the fixed shaft 35. The housing 38 has rigidly mounted thereon in a well known manner the field windings 39 of the motor. Along the outer periphery of the housing 38 are mounted a plurality of propelling blades 40 which are adapted by the rotation of said housing to displace a fluid in a manner already indicated in connection with the hereinbefore described embodiments.

Referring now to the embodiment shown in Figs. 8 and 9 of the drawings, the fixed shaft 41 has mounted thereon a plurality of engine cylinders 42, said cylinders being adapted by their mounting to be revolved about the fixed shaft 41. Extending about the outer ends of the cylinders 42 is a strap 43 upon which is rigidly secured, at any points at which it may be desired to mount propeller blades, a toothed disk 44 intermeshing with a toothed disk 45, said disks 45 having rigidly secured thereon a plurality of propeller blades 46, 47, 48, 49 and 50. In order to provide means for holding the toothed disks 44 and 45 in rigid engagement with each other, a plurality of bolts 51 or other suitable fastening means, are employed, said fastening means being adapted to be released to permit each of said blades to be adjusted independently of the other blades. In this embodiment the several blades 46 to 50 are set upon radial axes, which axes preferably co-incide with the axes of the cylinders 42 respectively. Referring to Fig. 10, however, a modification of the arrangement of the propeller blades upon the cylinders is shown in which said blades are mounted on axes offset at successively increasing distances from the axes of the respective cylinders upon which they are mounted. Thus, by an inspection of the upper half of Fig. 10 it will be seen that the blade 46 is the farthest removed to the left of the axis of its cylinder, the blade 47 being nearer to the axis of its cylinder, while the blade 48 is co-axially mounted with its cylinder. Continuing, the blade 49 is offset to the right a short distance from the axis of the cylinder upon which it is mounted while the blade 50 is mounted farther from the axis of its cylinder. It will be noted furthermore that each blade is set at a different pitch from any of the other blades, the purpose of which is to provide a graduated means for increasing the grip of the propeller upon the air or other fluid in which it may be operated. Thus the blade 50 farthest to the right is set at the least pitch while the blade 46 is set at the greatest pitch. The advantages of this arrangement result from the fact that the displacement of the fluid is developed gradually in such a manner as to aid materially in obviating the production of eddy currents in the displaced fluid, which currents interfere considerably with the efficient operation of the device. In order, however, to more completely obviate the defects attendant upon the production of eddy currents, a twin motor is mounted co-axially with the motor just described, said twin motor being represented on the diagram by the lower portion of Fig. 10. In this portion it will be noted that the blades are set respectively at the same pitches as the corresponding blades in the upper portion of Fig. 10 but are oppositely arranged so as to enable the two motors to be rotated in opposite directions. In this way, the production of eddy currents is reduced to a minimum.

Referring now to Fig. 11, a still further modification of this embodiment of the propeller is shown in which the several blades are mounted co-axially with the cylinders upon which they are respectively mounted but which blades are set at successively different pitches relatively to the axis of the stationary shaft.

In Fig. 12 is shown means for mounting a propeller blade upon one of the cylinders independently of the other cylinders. In this embodiment a blade 52 is provided with a cap 53 preferably integral therewith, said cap being adapted to fit over the end of a cylinder 54, and to be secured thereto by means of a set screw 55. In Fig. 13 is shown a modification of the embodiment shown in Fig. 12 in which the cap is elongated into a jacket 56 provided with a plurality of ribs 57, said jacket being thereby adapted to fulfil the functions of a cooling jacket.

Referring to Fig. 14, in which is shown another embodiment of my invention, each of the cylinders 58 is provided with a water jacket by means of a shell 59 preferably formed integrally with a blade 60, said jacket being adapted to be fitted over said cylinder 58 and rigidly secured adjacent the fixed shaft with the adjacent cylinders comprising parts of the motor. If desired, however, said water jacket and cylinder may be integrally cast and the several castings secured together in the same manner.

Referring now to Fig. 15, a diagrammatic illustration of means for revolubly mounting the entire motor is shown. According to this embodiment of the invention a pair of motors 61 and 62 are rotatably mounted upon a fixed shaft 63, said fixed shaft being pivotally mounted at 64 and rigidly connected with a segment gear 65 whereby it may be swung about its pivot 64 by means of a pinion 66 intermeshing with the segment gear 65. Said pinion 66 may be rotated by a crank 67 or any other suitable means.

Referring to Fig. 16, the embodiment shown therein comprises a fixed shaft 68 upon which is mounted an odd number of cylinders 69 rigidly secured together to form the rotating member, and a pair of propeller blades 70 and 71 mounted thereon diametrically opposite. In order to provide means for mounting these blades oppositely upon a motor embodying an odd number of cylinders, one of said blades, such as the blade 71, is secured to a supporting bar 72 suitably bent at each end to adapt it to be secured to the walls of two of the adjacently mounted cylinders.

While I have shown and described the present invention in connection with certain specific embodiments of the same, it will be obvious that various modifications may be embodied therein, without departing from the spirit of my invention. Thus, in the embodiment shown in Figs. 1 and 2, the blades 17 mounted between the cylinders 6 may be of different size from the blades 10 mounted on the ends of the said cylinders. Said blades 17 may be employed in combination with the blades 10 for which purpose they may be mounted nearer to the center of the fixed shaft 1, and at any desired angle to increase the efficiency of the propelling action. Again, it will be evident that in connection with the embodiment shown in Figs. 4 and 5, any suitable device well known in the art may be employed to adjust the angular pitch of the blades 18 while the propeller is in action. I do not, therefore, wish to be limited to the specific construction herein shown and described.

What I claim is—

1. In a device of the character described, the combination with a motor embodying a stationary member and a second member revolving about the first said member, of a plurality of propeller blades mounted on said revolving member, and means for varying the pitch of said blades on said revolving member.

2. The combination with a motor embodying a fixed shaft and a member revolved about said shaft by the action of said motor, of a plurality of propeller blades adjustably mounted on said revolving member.

3. The combination with a fixed shaft, of a frame rotatable on said shaft, a plurality of motors mounted on said frame to be revolved about said shaft, a plurality of propeller blades adjustably mounted on said motors, and means for adjusting the pitch of said blades.

4. The combination with a fixed shaft, of a plurality of motors revoluble about said shaft, propeller blades rotatably adjustable on said motors, and means for simultaneously adjusting said blades.

5. The combination with a stationary shaft, of a plurality of motors revoluble about said shaft, propeller blades mounted on said motors, said propeller blades being rotatable on their own axes to adjust the pitch of said blades, and means for imparting said adjustment.

6. The combination with a fixed shaft, of motors revoluble about said shaft, a plurality of propeller blades mounted on said motors, said blades being rotatably adjustable on radial axes, and means for adjusting the pitch of said blades.

7. The combination with a fixed shaft, of a plurality of reciprocating engines having cylinders revoluble about said shaft, each of said cylinders being provided with a propeller blade adjustably mounted thereon.

8. The combination with a fixed shaft, of a plurality of reciprocating engines having cylinders revoluble about said shaft, each of said cylinders being provided with a propeller blade adjustably mounted thereon, and means for adjusting the positions of said blades.

9. The combination with a fixed shaft, of a motor embodying a plurality of cylinders revoluble about said shaft, a propeller blade mounted on a cylinder head, and a propeller blade mounted intermediately of two adjacent cylinders.

10. The combination with a fixed shaft, of a motor embodying a plurality of cylinders revoluble about said shaft, a propeller blade mounted on a cylinder head, and a propeller blade mounted intermediately of two adjacent cylinders, said blades being adjustable in pitch.

11. The combination with a fixed shaft, of a motor embodying an odd number of reciprocating engines revoluble about said shaft, and two propeller blades and means for mounting said blades diametrically opposite to each other on said engines.

12. In a device of the character described, the combination with a fixed shaft, of a cylinder revoluble about said shaft, a cooling jacket for said cylinder, and a propeller blade rigid with said jacket.

13. In a device of the character described, the combination with a fixed shaft, of a cylinder revoluble about said shaft, a cooling jacket removably mounted on said cylinder, and a propeller blade rigid with said jacket.

14. In a device of the character described, the combination with a fixed shaft, of a plurality of cylinders revoluble about said shaft, each of said cylinders being provided with a removable cooling jacket, and a propeller blade rigidly mounted on each of said cooling jackets.

15. In a device of the character described, the combination with a fixed shaft, of a plurality of cylinders revoluble about said shaft, and a plurality of blades mounted on said cylinders, said blades being set at different pitches.

16. In a device of the character described, the combination with a fixed shaft, of a plurality of cylinders revoluble about said shaft, and a plurality of blades mounted on said cylinders, said blades being set at different pitches and offset at different distances from the axes of the respective cylinders upon which they are mounted.

17. In a device of the character described, the combination with a fixed shaft, of a plurality of cylinders revoluble about said shaft, and a plurality of blades carried by said cylinders, said blades being set at different pitches and the axis of each blade being offset from the axis of the cylinder upon which it is mounted, a different distance than each of the axes of the other blades are offset from the axes of the respective cylinders upon which they are mounted.

18. In a device of the character described, the combination with a fixed shaft, of a plurality of cylinders revoluble about said shaft, and a plurality of blades mounted on said cylinders, the axis of each blade being offset from each of two different planes through the axis of the cylinder upon which it is mounted, a different distance than that at which each of the other blades is offset from the axis of the respective cylinder upon which it is mounted.

19. In a device of the character described, the combination with a fixed shaft, of a plurality of cylinders revoluble about said shaft, and a plurality of blades mounted on said cylinders, the axes of said blades being arranged in a helix.

20. In a device of the character described, the combination with a fixed shaft, of a plurality of cylinders revoluble about said shaft, and a plurality of blades mounted on said cylinders, the axes of said blades being arranged in a helix extending around the axis of the fixed shaft.

21. In a device of the character described, the combination with a fixed shaft, of a plurality of cylinders revoluble about said shaft, said cylinders being arranged on radial axes, and a plurality of propeller blades mounted on said cylinders, said blades being set at different pitches and having their axes arranged in a helix about the axis of the fixed shaft.

22. In a device of the character described, the combination with a fixed shaft, of a plurality of cylinders revoluble about said shaft, said cylinders being arranged on radial axes, and a plurality of propeller blades detachably secured to said cylinders, said blades having their axes arranged in a helix about the axis of the fixed shaft.

23. In a device of the character described, the combination with a fixed shaft, of a cylinder revoluble about said shaft, a cooling jacket removably mounted on said cylinder, and a propeller blade rigid on said cooling jacket.

24. In a device of the character described, the combination with a stationary shaft, of a plurality of motors revolubly mounted thereon to travel in the same orbit around said shaft, said motors being provided with propeller blades and adapted to operate in opposite directions.

25. In a device of the character described, the combination with a stationary shaft normally fixed in position, of a plurality of motors revolubly mounted in groups spaced along said shaft, said motors being provided with propeller blades and arranged to travel in opposite directions in orbits around said shaft, and means for changing the angular position of said shaft.

26. The combination with a fixed shaft, of a motor embodying a cylinder revoluble about said shaft, a reciprocating piston in said cylinder, an adjustable propeller blade carried by said cylinder, and means connecting said piston to said shaft to adapt said motor to revolve the cylinder around the shaft.

27. The combination with a shaft, of a motor embodying a cylinder, revoluble about said shaft, a reciprocating piston in said cylinder, an adjustable propeller blade carried by said cylinder, and means connecting said piston to said shaft to adapt said motor to revolve the cylinder around the shaft.

28. The combination of two motors revolving in opposite directions about the same axis in different planes, and adjustable propellers on the motors.

29. The combination of two engines revolving in opposite directions about the same axis in different planes, and propeller blades projecting from and adjustably mounted on each of the engines.

In testimony whereof I have signed my name to this specification, in the presence of two subscribing witnesses, on this 21st day of September A. D. 1909.

ANTHONY R. SILVERSTON.

Witnesses:
 J. H. JOCHUM, Jr.,
 ARTHUR O. KNIGHT.